(12) United States Patent
Li

(10) Patent No.: US 11,535,423 B1
(45) Date of Patent: Dec. 27, 2022

(54) STORAGE BOX AND STORAGE RACK

(71) Applicant: Lijun Li, Shenzhen (CN)

(72) Inventor: Lijun Li, Shenzhen (CN)

(*) Notice: Subject to any disclaimer, the term of this patent is extended or adjusted under 35 U.S.C. 154(b) by 0 days.

(21) Appl. No.: 17/523,921

(22) Filed: Nov. 11, 2021

(51) Int. Cl.
*B65D 21/02* (2006.01)
*B62B 3/00* (2006.01)

(52) U.S. Cl.
CPC .......... *B65D 21/0234* (2013.01); *B62B 3/005* (2013.01); *B62B 2205/32* (2013.01)

(58) Field of Classification Search
CPC .. B65D 21/0234; B62B 3/005; B62B 2205/32
See application file for complete search history.

(56) References Cited

U.S. PATENT DOCUMENTS

| | | | | |
|---|---|---|---|---|
| 4,420,315 A | * | 12/1983 | Kershaw | B01D 46/00 29/469 |
| 5,238,128 A | * | 8/1993 | Stoddard | A47B 87/0223 D34/21 |

* cited by examiner

*Primary Examiner* — Andrew D Perreault

(57) ABSTRACT

The present disclosure provides a storage box, including a bottom, a first side wall, a second side wall, a third side wall and a fourth side wall. The first side wall, the second side wall, the third side wall and the fourth side wall sequentially surround the bottom. The first side wall is parallel to the third side wall, the second side wall is parallel to the fourth side wall, the first side wall is perpendicular to the second side wall, a first notch is disposed on the first side wall, a second notch is disposed on the second side wall, a width of the first notch is larger than or equal to a thickness of the second side wall, a width of the second notch is larger than or equal to a thickness of the first side wall.

8 Claims, 9 Drawing Sheets

STORAGE BOX AND STORAGE RACK

TECHNICAL FIELD

The present disclosure relates to a field of storage devices, and in particular to a storage box and a storage rack.

BACKGROUND

Storage boxes are boxes used for storing items, when there are requirements to use the storage boxes, the storage boxes are taken out to storage the items, and when the requirements are gone, a storage problem of the storage boxes needs to be considered. In particular, the storage boxes are not only applied to industrial production, but also are widely applied to all aspects such as daily life, etc.

When there are a plurality of idle storage boxes, the storage boxes need to be stacked, a space occupied by the storage boxes is equal to a total volume of all the storage boxes, which requires a large space, so that there is a requirement for providing a storage box capable of considering about the large space is occupied when the plurality of the idle storage boxes are stored.

SUMMARY

In order to solve technical problems mentioned in the background, the present disclosure provides a storage box and a storage rack.

The present disclosure provides a storage box, including a bottom, a first side wall, a second side wall, a third side wall and a fourth side wall. The first side wall, the second side wall, the third side wall and the fourth side wall sequentially surround the bottom. The first side wall is parallel to the third side wall, the second side wall is parallel to the fourth side wall, and the first side wall is perpendicular to the second side wall. A first notch is disposed on the first side wall, a second notch is disposed on the second side wall, a width of the first notch is larger than or equal to a thickness of the second side wall, a width of the second notch is larger than or equal to a thickness of the first side wall.

Furthermore, the first notch is closer to the fourth side wall than to the second side wall.

Furthermore, the second notch is closer to the third side wall than to the first side wall.

The present disclosure further provides a storage rack, including supporting rods, a bottom storage box, a top storage box, and at least one middle storage box. The bottom storage box, the top storage box, and the middle storage box each defines a plurality of mounting holes thereon for installing ends of the supporting rods, two of the mounting holes defined on the middle storage box are coaxial along a vertical direction, adjacent storage boxes of any two of the bottom storage box, the top storage box, and the middle storage box, are detachably connected through the supporting rods. The bottom storage box, the top storage box and the middle storage box are sequentially stacked, and the middle storage box is in a structure of the above storage box.

The storage rack further includes a first sliding component and a second sliding component. The first sliding component slides along two sides of the first notch to block the first notch, and the second sliding component slides along two sides of the second notch to block the second notch.

Furthermore, a cross section of the first sliding component is of an I-shaped structure.

Furthermore, a respective hook part is disposed on an outward side surface of the first sliding component and/or an outward side surface of the second sliding component.

Furthermore, a protrusion part is disposed on an inner side wall of each of the mounting holes, and the protrusion part is gradually inclined from outside to inside, so that a diameter of each of the mounting holes becomes smaller when gradually closing to a bottom of each of the mounting holes.

Furthermore, structures of the bottom storage box, the top storage box, and the middle storage box are all consistent.

Further, the adjacent storage boxes of any two of the bottom storage box, the top storage box, and the middle storage box, are connected through four of the supporting rods. At least four of the mounting holes are respectively defined on four side corners of the bottom storage box and/or four side corners of the top storage box, at least four sets of the mounting holes are respectively defined on four side corners of the middle storage box, and each of the four sets of the mounting holes includes two mounting holes where the two mounting holes are coaxial along a vertical direction.

In the present disclosure, a respective notch is disposed on each of two adjacent side walls of the storage box, and a width of the notch is larger than or equal to a thickness of each of the side walls, so that two identical storage boxes are embedded through the notch on any one of the two storage boxes, thereby saving a space formed after the two storage boxes overlap. In addition, any two of the storage boxes may be embedded to save space, when there are requirements to store two or more idle storage boxes, the present disclosure provides a small structural change to bring an obvious storage space change, which needs neither complicated splicing structures nor cumbersome operation steps.

DETAILED DESCRIPTION

Figure 1:
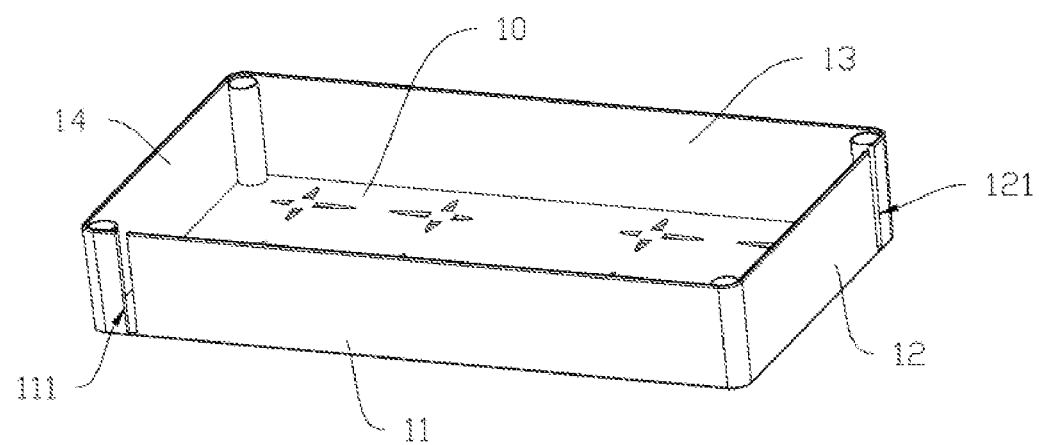
FIG. 1 is an overall structural schematic diagram of a storage box of the present disclosure.
Figure 2:
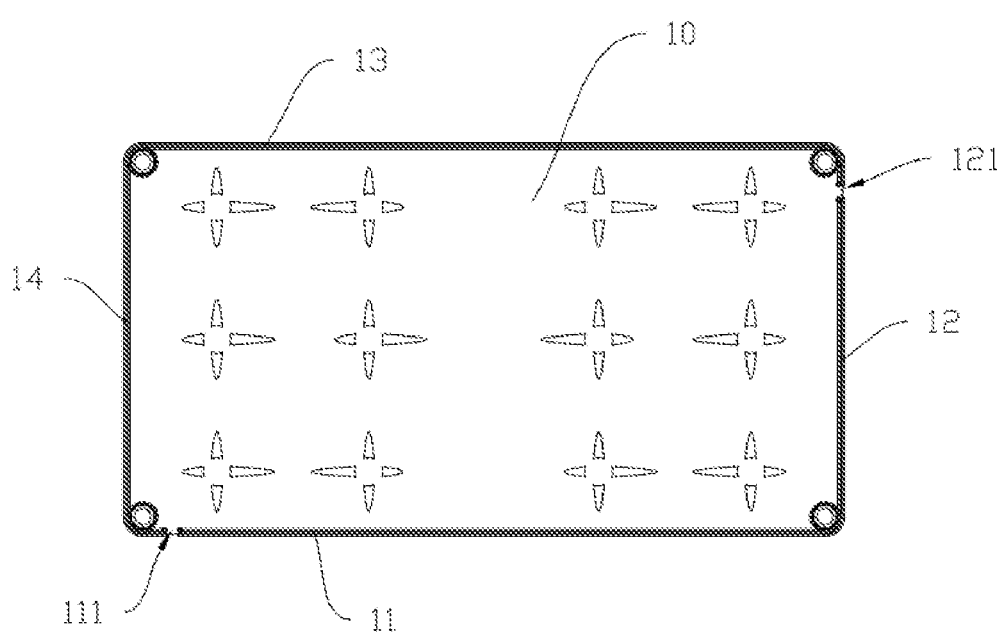
FIG. 2 is a top schematic diagram of one embodiment of FIG. 1.

Technical solutions in embodiments of the present disclosure are clearly and completely described below in conjunction with accompanying drawings in the embodiments of the present disclosure. Obviously, the described embodiments are merely a part of the embodiments of the present disclosure, rather than all the embodiments. Based on the embodiments of the present disclosure, all other embodiments obtained by a person of ordinary skill in the art without creative efforts shall fall within the protection scope of the present disclosure. It is to be understood that the drawings are merely provided for reference and illustration, and the drawings are not intended to limit the present disclosure. A connection relationship shown in the drawings is merely for the convenience of clear description, and the connection relationship does not define a connection mode.

It should be noted that when a component is considered to be "connected" to another component, it may be directly connected to another component, or a centering component may be present at the same time. Unless otherwise defined, all technical and scientific terminologies used herein have the same meaning as commonly understood by one of ordinary skill in the art to which present disclosure belongs. It should further be noted that the terms "mounted", "communicated", and "connected" are to be understood broadly, for example, may be fixedly connected or detachably connected or integrally connected, may be mechanically connected or electrically connected, and may be in communication with the interior of two elements. For a person of ordinary skill in the art, the specific meanings of the above terminologies in the present disclosure may be understood according to the specific situations. The terminologies used in the specification of the present disclosure herein are merely for the purpose of describing particular embodiments and are not intended to limit the present disclosure.

It should further be noted that, in the description of the present disclosure, orientations or positional relationships indicated by the terminologies "center", "upper", "lower", "left", "right", "vertical", "horizontal", "inner", and "outer" are based on the orientations or the positional relationships shown in the drawings. The terminologies are merely for the convenience of describing the present disclosure and simplifying the description, rather than indicating or implying that the indicated device or element needs to have a specific orientation, be constructed and operated in a specific orientation, and therefore cannot be understood as a limitation of the present disclosure. In addition, the terminologies "first", "second", and "third" are merely used for descriptive purposes and are not to be understood as indicating or implying relative importance.

Refer to FIGS. 1-6, the present disclosure firstly provides a storage box 100, including a bottom, a first side wall 11, a second side wall 12, a third side wall 13, and a fourth side wall 14. The first side wall 11, the second side wall 12, the third side wall 13, and the fourth side wall 14 sequentially surround the bottom. The first side wall 11 is parallel to the third side wall 13, the second side wall 12 is parallel to the fourth side wall 14, and the first side wall 11 is perpendicular to the second side wall 12. A first notch 111 is disposed on the first side wall 11, a second notch 121 is disposed on the second side wall 12, a width of the first notch 111 is larger than or equal to a thickness of the second side wall 12, and a width of the second notch 121 is greater than or equal to a thickness of the first side wall 11.

In the present disclosure, a respective notch is disposed on each of two adjacent side walls of the storage box 100, and a width of the notch is larger than or equal to a thickness of each of the side walls, so that two identical storage boxes 100 are embedded through the notch on any one of the two storage boxes 100, thereby saving a space formed after the two storage boxes 100 overlap. In addition, any two of the storage boxes 100 may be embedded to save space, when there are requirements to store two or more idle storage boxes 100, the present disclosure provides a small structural change to bring an obvious storage space change, which needs neither complicated splicing structures nor cumbersome operation steps.

Optionally, the first notch 111 is closer to the fourth side wall 14 than to the second side wall 12. In one embodiment, the first notch 111 is disposed at a position close to the fourth side wall 14, so that when the two storage boxes 100 are embedded, an overlapping space of the two embedded storage boxes 100 is larger.

Optionally, the second notch 121 is closer to the third side wall 13 than to the first side wall 11. In one embodiment, the second notch 121 is disposed at a position close to the third side wall 13, so that when the two storage boxes 100 are embedded, an overlapping space of the two embedded storage boxes 100 is larger.

Figure 3:
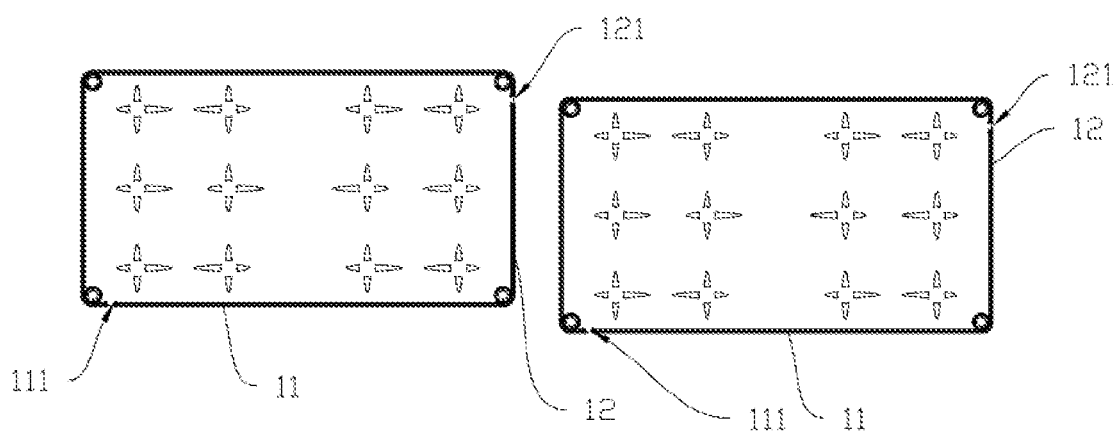
FIG. 3 is a schematic diagram of a combination of any two embodiments of FIG. 1 where the two embodiments are combined in a first state.

As shown in FIG. 3, a first state is a state when the two storage boxes 100 are not assembled to be embedded, namely an original state.

Figure 4:
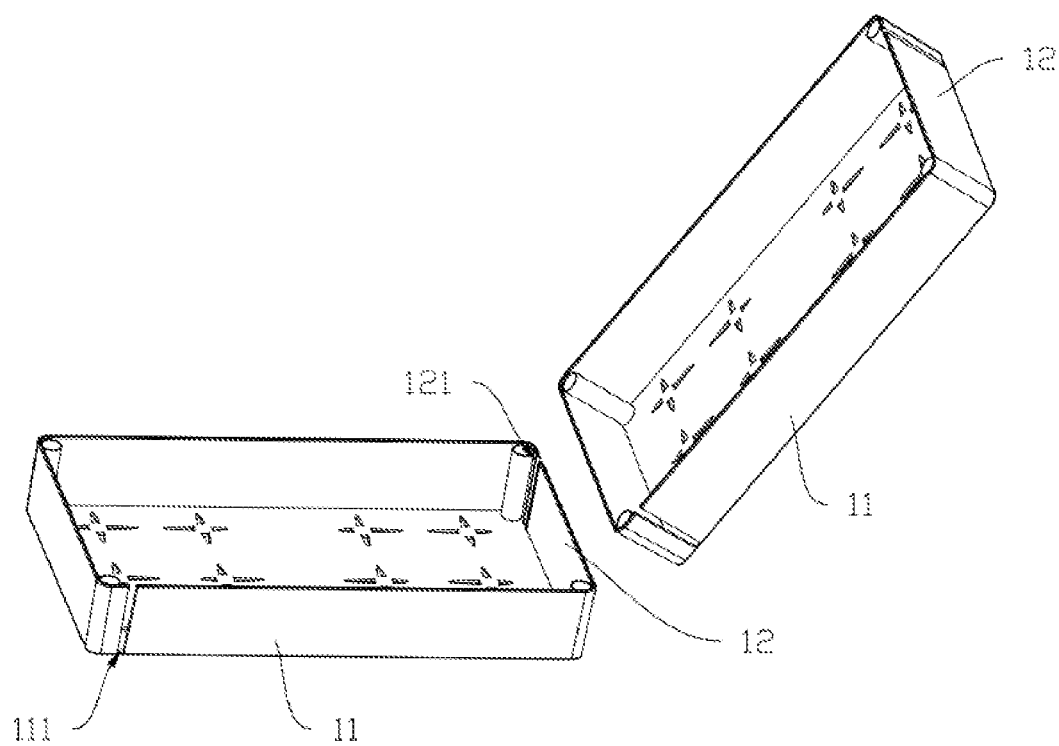
FIG. 4 is a schematic diagram of a combination of any two embodiments of FIG. 1 where the two embodiments are combined in a second state.

As shown in FIG. 4, a second state is a state when the two storage boxes 100 are being assembled to be embedded, namely an ongoing state.

Figure 5:
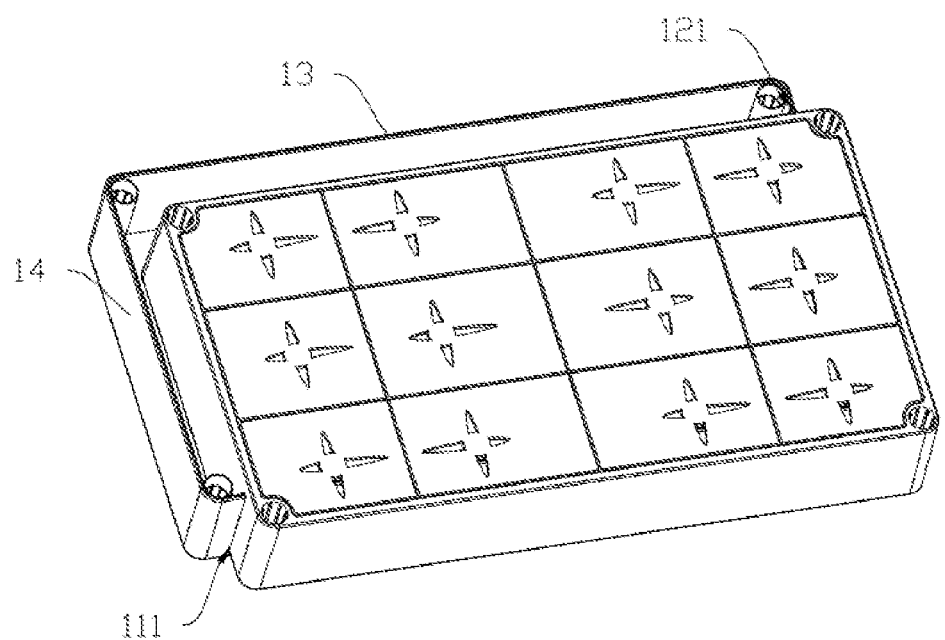
FIG. 5 is a schematic diagram of a combination of any two embodiments of FIG. 1 where the two embodiments are combined in a third state.
Figure 6:
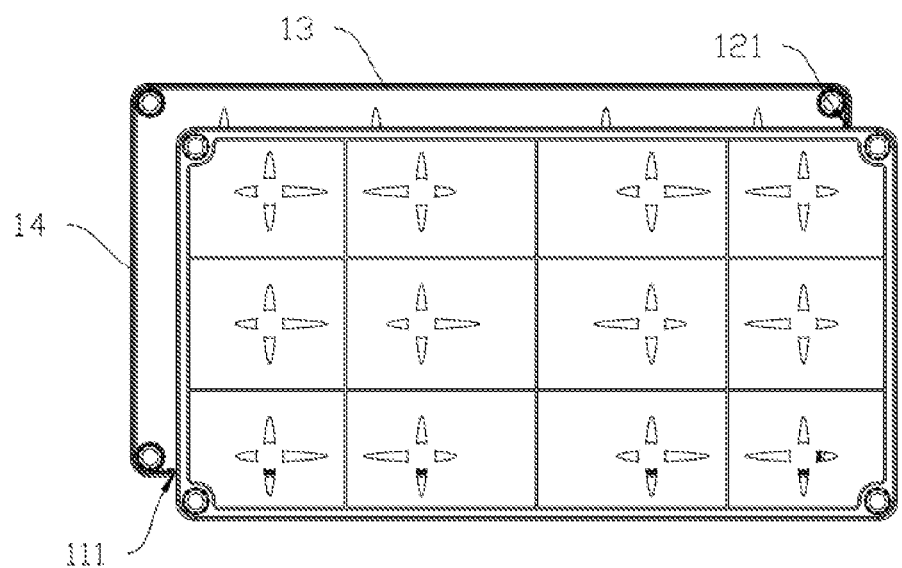
FIG. 6 is a top schematic diagram of a structure shown in FIG. 5.

As shown in FIG. 5, a third state is a state after the two storage boxes 100 are assembled to be embedded, namely an end state.

Figure 7:
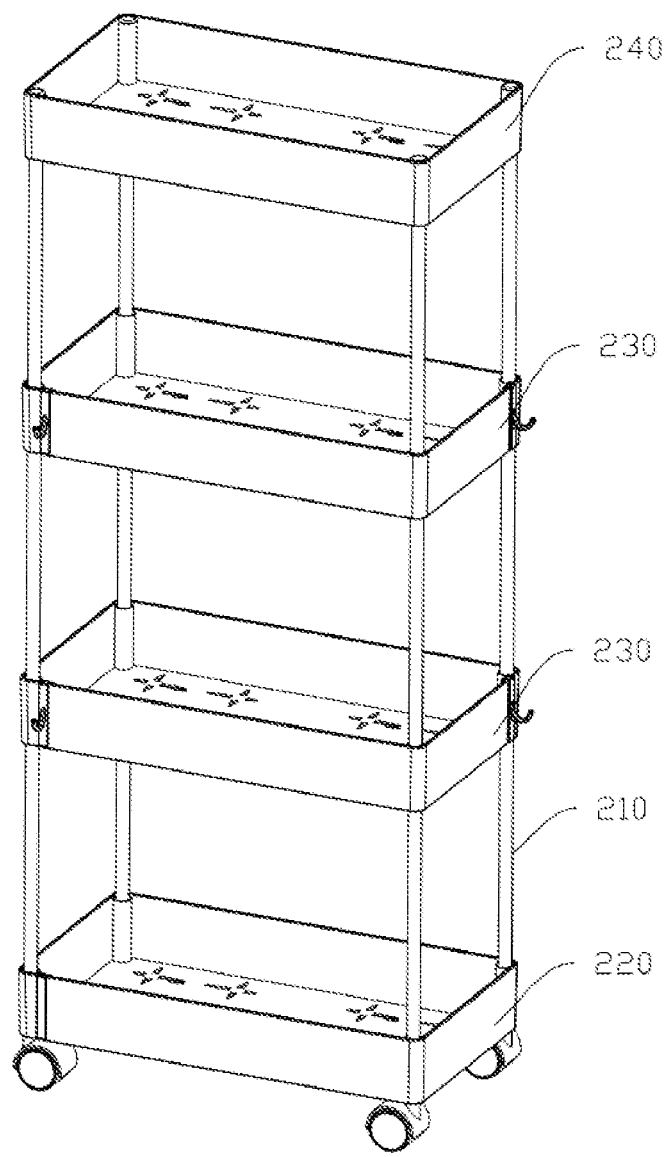
FIG. 7 is an overall structural schematic diagram of a storage rack according to one embodiment of the present disclosure.
Figure 8:
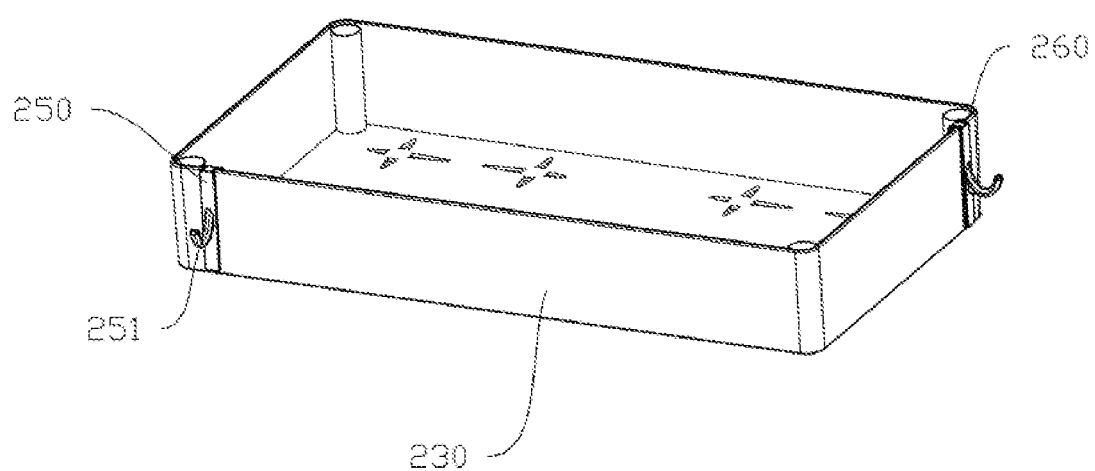
FIG. 8 is an assembly schematic diagram of parts of components in the one embodiment of FIG. 7.
Figure 9:
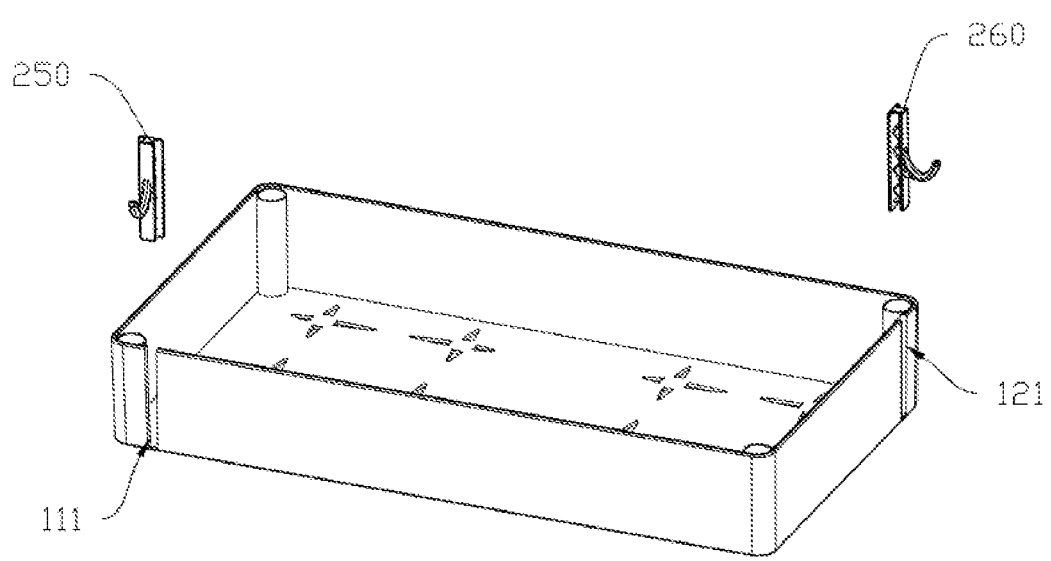
FIG. 9 is an exploded schematic diagram of the components shown in FIG. 8.

Refer to FIGS. 7-9, the present disclosure further provides a storage rack 200, including supporting rods 210, a bottom storage box 220, a top storage box 230, and at least one middle storage box 240. The bottom storage box 220, the top storage box 230, and the middle storage box 240 each defines a plurality of mounting holes thereon for installing ends of the supporting rods 210, two of the mounting holes defined on the middle storage box 240 are coaxial along a vertical direction, adjacent storage boxes of any two of the bottom storage box 220, the top storage box 230, and the middle storage box 240, are detachably connected through the supporting rods 210. The bottom storage box 220, the top storage box 230 and the middle storage box 240 are sequentially stacked, and the middle storage box 240 is in a structure of the above storage box.

Optionally, the adjacent storage boxes of any two of the bottom storage box, the top storage box, and the middle storage box, are connected through four of the supporting rods 210. At least four of the mounting holes are respectively defined on four side corners of the bottom storage box 220 and/or four side corners of the top storage box 230, at least four sets of the mounting holes are respectively defined on four side corners of the middle storage box 240, and each of the four sets of the mounting holes includes two mounting holes where the two mounting holes are coaxial along a vertical direction.

Optionally, in one embodiment of the present disclosure, a protrusion part (not shown in the drawings) is disposed on an inner side wall of each of the mounting holes, and the protrusion part is gradually inclined from outside to inside, so that a diameter of each of the mounting holes becomes smaller when gradually closing to a bottom of each of the mounting holes. In one embodiment, the protrusion part gradually extends toward a center of each of the mounting holes and the diameter of which is further reduced, so that the supporting rods 210 inserted into the mounting holes are gradually restricted until the supporting rods 210 are firmly installed, so as to achieve a purpose of convenient insertion and installation.

The storage rack 200 further includes a first sliding component 250 and a second sliding component 260. The first sliding component 250 slides along two sides of the first notch 111 to block the first notch 111, and the second sliding component 260 slides along two sides of the second notch 121 to block the second notch 121. In one embodiment, the first sliding component and the second sliding component are disposed to respectively block the first notch 111 and the second notch 121, so as to avoid risk that small items are easily separated from notches due to leakage of the notches, and an assembly method of sliding the corresponding components to assemble the storage rack is convenient for disassembly and installation.

Specifically, a respective hook part 251 is further disposed on an outward side surface of the first sliding component 250 and/or an outward side surface of the second sliding component 260. In one embodiment, the hook part 251 is configured to hang corresponding items, which provides an additional storage function for the storage rack 200.

Specifically, in one embodiment of the present disclosure, a cross section of the first sliding component 250 is of an I-shaped structure.

In a preferred embodiment of the present disclosure, structures of the bottom storage box 220, the top storage box 230, and the middle storage box 240 are all consistent, namely that the storage rack 200 merely needs one storage box structure, so that only one mold is needed for processing, which is further convenient for batch processing and production, thereby, a machining cost is reduced, and production efficiency is improved.

In the specification and claims of the present disclosure, the words "include/comprise" and "have/are" and variations thereof are used to specify the presence of stated features, values, steps or components, but do not preclude the presence or addition of one or more other features, values, steps, components, or combinations thereof.

Some features of the present disclosure are described for clarity and are respectively described in different embodiments, however, these features may further be described in connection with a single embodiment. On the contrary, some features of the present disclosure are described merely in a single embodiment for the sake of brevity, however, the features may further be described separately or in any suitable combination in different embodiments.

The above are merely preferred embodiments of the present disclosure and are not intended to limit the present disclosure. Any modification, equivalent replacement and improvement made within the spirit and principle of the present disclosure should be included in the protection scope of the present disclosure.

What is claimed is:

1. A storage rack, comprising:
supporting rods;
a bottom storage box;
a top storage box; and
at least one middle storage box;
wherein the bottom storage box, the top storage box, and the at least one middle storage box each defines a plurality of mounting holes thereon for installing ends of the supporting rods, two of the mounting holes defined on the at least one middle storage box are coaxial along a vertical direction, adjacent storage boxes of any two of the bottom storage box, the top storage box, and the at least one middle storage box, are detachably connected through the supporting rods; the bottom storage box, the top storage box and the at least one middle storage box are sequentially stacked, and the at least one middle storage box has a structure comprising:
a bottom;
a first side wall;
a second side wall;
a third side wall; and
a fourth side wall;
wherein the first side wall, the second side wall, the third side wall, and the fourth side wall sequentially surround the bottom; the first side wall is parallel to the third side wall, the second side wall is parallel to the fourth side wall, and the first side wall is perpendicular to the second side wall;
a first notch is disposed on the first side wall, a second notch is disposed on the second side wall, a width of the first notch is larger than or equal to a thickness of the second side wall, and a width of the second notch is larger than or equal to a thickness of the first side wall; and
the storage rack further comprises a first sliding component and a second sliding component; wherein the first sliding component is disposed within the first notch, the second sliding component is disposed within the second notch, and the first sliding component slides along two sides of the first notch to block the first notch, and the second sliding component slides along two sides of the second notch to block the second notch.

2. The storage rack according to claim 1, wherein a cross section of the first sliding component is of an I-shaped structure.

3. The storage rack according to claim 1, wherein a respective hook part is further disposed on an outward side surface of the first sliding component and/or an outward side surface of the second sliding component.

4. The storage rack according to claim 1, wherein a protrusion part is disposed on an inner side wall of each of the mounting holes, and the protrusion part is gradually inclined from outside to inside, so that a diameter of each of the mounting holes becomes smaller when gradually closing to a bottom of each of the mounting holes.

5. The storage rack according to claim 1, wherein shapes of the bottom storage box, the top storage box, and the at least one middle storage box are all consistent.

6. The storage rack according to claim 1, wherein the adjacent storage boxes of the any two of the bottom storage box, the top storage box, and the middle storage box are connected through four of the supporting rods; at least four of the mounting holes are respectively defined on four side corners of the bottom storage box and/or four side corners of the top storage box; at least four sets of the mounting holes are respectively defined on four side corners of the middle storage box, and each of the four sets of the mounting holes comprises two mounting holes where the two mounting holes are coaxial along a vertical direction.

7. The storage rack according to claim 1, wherein the first notch is closer to the fourth side wall than to the second side wall.

8. The storage rack according to claim 1, wherein the second notch is closer to the third side wall than to the first side wall.

* * * * *